United States Patent
Zanotti et al.

(10) Patent No.: US 12,416,915 B2
(45) Date of Patent: Sep. 16, 2025

(54) ASSISTANCE METHOD FOR THE EXECUTION OF A FORMAT CHANGE IN AN AUTOMATIC MACHINE FOR MANUFACTURING OR PACKING SMOKING, HYGIENE, FOOD, OR PHARMACEUTICAL PRODUCTS AND RESPECTIVE AUTOMATIC MACHINE

(71) Applicant: G.D SOCIETA' PER AZIONI, Bologna (IT)

(72) Inventors: Maurizio Zanotti, Bologna (IT); Franco Spisni, Bologna (IT); Daniela Albertini, Bologna (IT); Giuliano Gamberini, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 708 days.

(21) Appl. No.: 17/772,585

(22) PCT Filed: Oct. 28, 2020

(86) PCT No.: PCT/IB2020/060095
§ 371 (c)(1),
(2) Date: Apr. 28, 2022

(87) PCT Pub. No.: WO2021/084437
PCT Pub. Date: May 6, 2021

(65) Prior Publication Data
US 2022/0374007 A1 Nov. 24, 2022

(30) Foreign Application Priority Data
Oct. 28, 2019 (IT) .......................... 102019000019852

(51) Int. Cl.
*G05B 23/02* (2006.01)
*B65B 19/30* (2006.01)
(Continued)

(52) U.S. Cl.
CPC .......... *G05B 23/0283* (2013.01); *B65B 19/30* (2013.01); *B65B 59/001* (2019.05);
(Continued)

(58) Field of Classification Search
CPC ............ G05B 23/0283; G05B 19/4183; G05B 2219/31418; G05B 2219/37252;
(Continued)

(56) References Cited

U.S. PATENT DOCUMENTS 6,725,184 B1 * 4/2004 Gadh ............... G05B 19/41805
703/22
10,234,851 B2 3/2019 Spindler et al.
(Continued)

FOREIGN PATENT DOCUMENTS

DE 19941485 A1 10/2000
DE 102012221458 B3 12/2013
(Continued)

OTHER PUBLICATIONS

Observations by a Third Party Focke & Co (CmbH & Co. KG) against G.D Societa Per Azioni for Corresponding European Patent Application No. 20815918.6, dated Jul. 25, 2022.
(Continued)

*Primary Examiner* — Santosh R Poudel
(74) *Attorney, Agent, or Firm* — MARSHALL, GERSTEIN & BORUN LLP (57) ABSTRACT

An assistance method for execution of a format change in an automatic machine can include dividing the format change into an orderly succession of operations for the removal of components designed for the old format and installation of components designed for the new format; communicating the orderly succession of removal and installation operations to an operator; electronically and automatically detecting the actual presence or absence of a component designed for the
(Continued)

old or new format before communicating to the operator the operation for removal or installation of the component; electronically and automatically detecting the actual absence or presence of a component designed for the old or new format after having communicated to the operator; and communicating to the operator the operation following an operation for the removal or installation of a component only after having electronically and automatically checked for the actual absence or presence of the component.

16 Claims, 6 Drawing Sheets

(51) Int. Cl.
*B65B 59/00* (2006.01)
*G05B 19/418* (2006.01)

(52) U.S. Cl.
CPC .................. *G05B 19/4183* (2013.01); *G05B 2219/31418* (2013.01); *G05B 2219/37252* (2013.01)

(58) Field of Classification Search
CPC ........... G05B 2219/31304; G05B 2219/32064; G05B 2219/31286; G05B 2219/31288; G05B 2219/32234; G05B 2219/49305; B65B 19/30; B65B 59/001; B65B 19/28; Y02P 90/02
See application file for complete search history.

(56) References Cited

U.S. PATENT DOCUMENTS

| | | | |
|---|---|---|---|
| 2002/0118228 A1* | 8/2002 | Bergo | G05B 19/409 |
| | | | 715/765 |
| 2002/0124394 A1* | 9/2002 | Slechta | G05B 19/41885 |
| | | | 29/771 |
| 2002/0194160 A1 | 12/2002 | Garrow et al. | |
| 2004/0128021 A1 | 7/2004 | Klekotka | |
| 2009/0230020 A1* | 9/2009 | Clayman | G06K 19/07327 |
| | | | 206/719 |
| 2010/0231407 A1* | 9/2010 | Carr | H04Q 9/00 |
| | | | 340/10.3 |
| 2014/0009291 A1* | 1/2014 | Requist | G06K 7/10009 |
| | | | 340/572.1 |
| 2014/0061313 A1 | 3/2014 | Zolfl et al. | |
| 2016/0209832 A1 | 7/2016 | Spindler et al. | |

FOREIGN PATENT DOCUMENTS

| | | | | |
|---|---|---|---|---|
| EP | 1225491 | A1 | 7/2002 | |
| EP | 1497182 | B1 | 1/2006 | |
| EP | 2706014 | A1 | 3/2014 | |
| EP | 2821865 | A1 | 1/2015 | |
| EP | 2982607 | B1 | 12/2016 | |
| EP | 3044644 | B1 | 8/2020 | |
| JP | 2003011926 | A | 1/2003 | |
| JP | 2010156672 | A * | 7/2010 | ............. G01M 3/16 |
| JP | 2016-097989 | A | 5/2016 | |
| RU | 2680308 | C2 | 2/2019 | |
| WO | WO-2019/155421 | A1 | 8/2019 | |
| WO | WO-2019/155422 | A1 | 8/2019 | |
| WO | WO-2019155420 | A1 | 8/2019 | |
| WO | WO-2019/224857 | A1 | 11/2019 | |

OTHER PUBLICATIONS

Observations by a Third Party Focke & Co (CmbH & Co. KG) against G.D Societa Per Azioni for Corresponding European Patent Application No. 20815918.6, dated Apr. 28, 2023.
European Patent Application No. 20815918.6, Notice of Opposition (Baluff), dated Sep. 6, 2024.
European Patent Application No. 20815918.6, Notice of Opposition (Focke), dated Sep. 3, 2024.
Manual for Tool-ID Upgrade Exhibit, Balluff Sensors Worldwide, 1-7 (2014).
Saussele, Product description for complete solution Balluff Tool-ID, BU Systems, 1-2 (2013).
Strate et al., Funkchips—Radio Frequency Identification (RFID), Scientific Services of the German Bundestag, 15/2005: 1-2 (2005).
Trade fair guide, Balluff Sensors Worldwide Marketing AMB 16.-20.09.2014, 1-20 (2014).
International Search Report and Written Opinion, corresponding International Application No. PCT/IB2020/060095, mailing date Feb. 17, 2021.
Written Opinion of the International Preliminary Examining Authority, corresponding International Application No. PCT/IB2020/060095, mailing date Sep. 17, 2021.
International Preliminary Report on Patentability, corresponding International Application No. PCT/IB2020/060095, mailing date Feb. 2, 2022.
Article 34 Amendments and Response to the International Search Report and Written Opinion for Corresponding International Application No. PCT/IB2020/060095 dated Aug. 6, 2021.
Response to Second Written opinion of the International Preliminary Examination Authority for Corresponding International Application No. PCT/IB2020/060095, dated Oct. 20, 2021.

* cited by examiner

| | | | | | |
|---|---|---|---|---|---|
| IDC | 23UKD326789 | UC | 146,2 | | |
| VS | 3.11.4 | UCeqv1 | 104,3 | | |
| IDCM | H600LM32560 | | | | |
| DTM | 12/11/2017 | UC10 | 3,6 | SC10 | 2,2 |
| DTO | 15/04/2016 | UC20 | 10,2 | SC20 | 8,4 |
| CF1 | 23 | UC30 | 8,7 | SC30 | 11,3 |
| CF2 | 0 | UC40 | 13,6 | SC40 | 21,8 |
| CF3 | 12 | UC50 | 14,1 | SC50 | 23,5 |
| CF4 | 143 | UC60 | 11,9 | SC60 | 31,6 |
| CF5 | 8 | UC70 | 16,8 | SC70 | 24,7 |
| Tmin | 12 | UC80 | 32,4 | SC80 | 11,2 |
| Tmax | 52 | UC90 | 22,6 | SC90 | 9,1 |
| Tavg | 31 | UC100 | 12,3 | SC100 | 2,4 |
| Smin | 101 | UCeqv2 | 95,0 | SCeqv | 81,6 |
| Smax | 2340 | | | | |
| Savg | 1433 | | | | |
| PSTN | B2 | | | | |

Fig.7

ASSISTANCE METHOD FOR THE EXECUTION OF A FORMAT CHANGE IN AN AUTOMATIC MACHINE FOR MANUFACTURING OR PACKING SMOKING, HYGIENE, FOOD, OR PHARMACEUTICAL PRODUCTS AND RESPECTIVE AUTOMATIC MACHINE

CROSS-REFERENCE TO RELATED APPLICATIONS

This patent application is a U.S. national phase of International Patent Application No. PCT/IB2020/060095 filed Oct. 28, 2020, which claims the benefit of priority from Italian patent application no. 102019000019852 filed on Oct. 28, 2019, the respective disclosures of which are each incorporated herein by reference in their entireties.

TECHNICAL FIELD

The present invention relates to an assistance method for the execution of a format change in an automatic machine for manufacturing or packing smoking, hygiene, food or pharmaceutical products and to a respective automatic machine. The present invention has an advantageous application to a packing machine which produces packets of cigarettes, to which the following disclosure will make explicit reference without thereby losing generality.

PRIOR ART

In the past, production of a single format of packets of cigarettes was designated to a cigarette wrapping line, the production of which was carried out without modifications for very long periods. In recent times an attempt has been made to replace said production philosophy with a "just in time" type of production philosophy, which provides for frequently changing the format of packets of cigarettes that must be produced by the same cigarette wrapping line in order to adapt, in real time, to market demands and thus avoid stockpiling. Consequently, it is ever more common that to an automatic packing machine for the production of packets of cigarettes, frequent format changes are carried out to in order to change the format of packets of cigarettes to be produced.

A format change operation in an automatic packing machine for the production of packets of cigarettes generally involves two types of intervention: a "mechanical" or "hardware" modification that involves replacing components that are not compatible with the new format, and a "logic" or "software" modification which involves replacing the configuration of the old format with the configuration of the new format in a control unit of the automatic packing machine.

The replacement of the components for the production of the old format with the components for the production of the new format normally requires the intervention of particularly expert technical personnel in order to avoid errors that can lead to a defective production or even to mechanical breakdown.

Furthermore, a packing machine for producing packets of cigarettes comprises a large number of components subject to inevitable wear during the operation of the packing machine. Basically, all the components of a packing machine must be periodically subjected to a maintenance intervention, which, depending on the type of component and the degree of wear, can be a simple cleaning, overhaul, calibration, partial replacement (namely parts only), or a complete replacement.

The number of operation hours of the component is used as the main criterion to establish the need and type of maintenance intervention on a component. The number of operation hours of the packing machine is obtained by reading the hour-counter of the packing machine, which measures the total number of operation hours of the packing machine, and the count of when the component was first installed on the packing machine.

Said methodology is effective for components that, once installed in the packing machine, are never replaced until the end of their life. However, a certain number of components of the packing machine are linked to the format of the cigarettes to be packaged and/or to the format of the packets to be made and are therefore replaced cyclically during the format changes. For these components linked to the format it is complex and laborious to accurately determine the actual number of hours worked and therefore the scheduling of their maintenance is difficult.

The patent application EP1225491A1 describes a method and a unit to change the configuration of an automatic machine, on the basis of which a user selects a desired final configuration by means of a selection device, and a display device displays an orderly list of all and only the operations to be performed on the machine for changing the machine from a current starting configuration to the desired final configuration; the list is arranged according to the sequence in which the operations are performed, and for each operation the status of at least one respective operating value is displayed in the initial configuration and the status of the same operating value is displayed in the final configuration.

DESCRIPTION OF THE INVENTION

The object of the present invention is to provide an assistance method for the execution of a format change in an automatic machine for manufacturing or packing smoking, hygiene, food or pharmaceutical products and a corresponding automatic machine, which assistance method is free from the drawbacks described above and, at the same time, is easy and inexpensive to implement.

According to the present invention, an assistance method for the execution of a format change in an automatic machine for manufacturing or packing smoking, hygiene, food, or pharmaceutical products and a respective automatic machine are provided, as claimed in the attached claims.

The claims describe preferred embodiments of the present invention forming an integral part of the present description.

BRIEF DESCRIPTION OF THE DRAWINGS

The present invention will now be described with reference to the attached drawings, which illustrate a non-limiting embodiment example thereof, wherein.

PREFERRED EMBODIMENTS OF THE INVENTION

Figure 1:
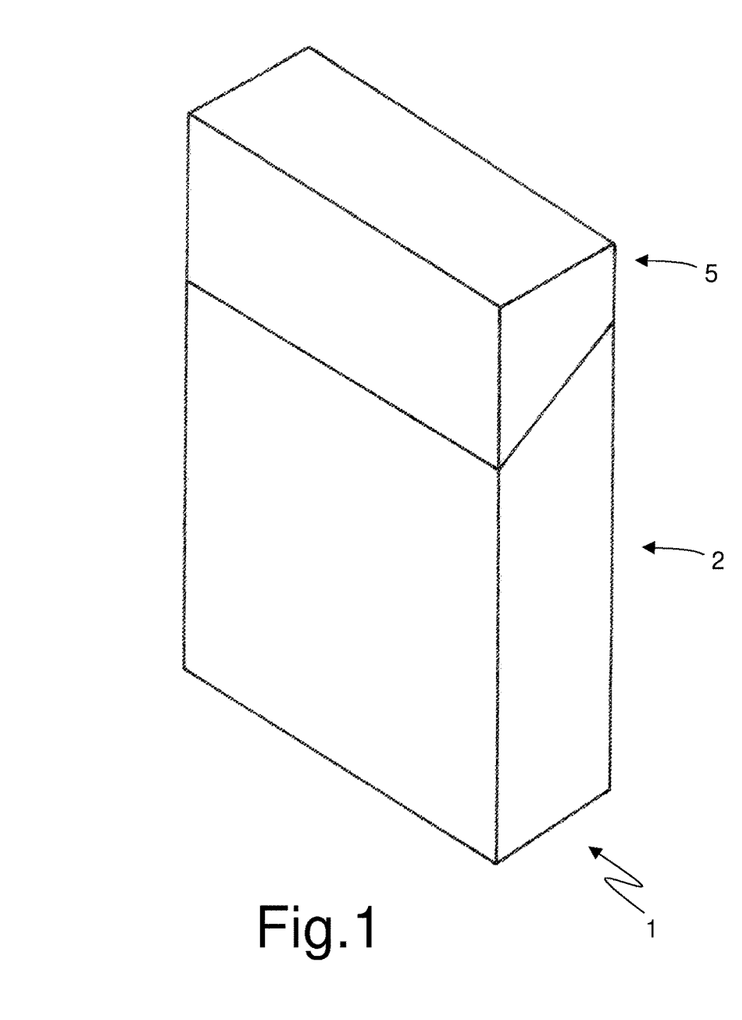
FIG. 1 is a front perspective view and in a closed configuration of a packet of cigarettes provided with two rigid containers one inside the other.
Figure 2:
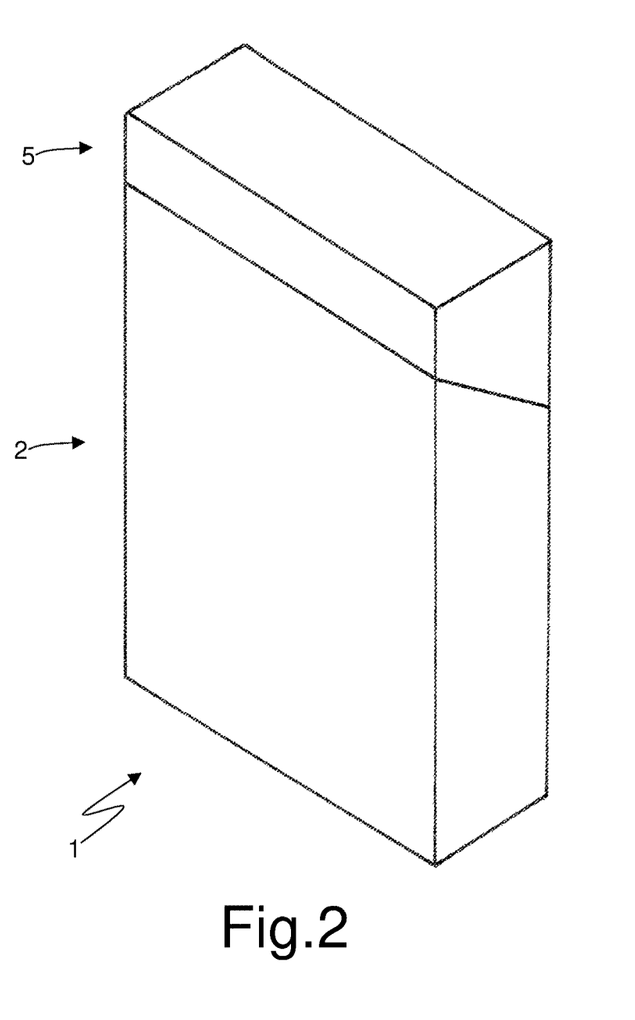
FIG. 2 is a rear perspective view of the packet of cigarettes of FIG. 1 in a closed configuration.
Figure 3:
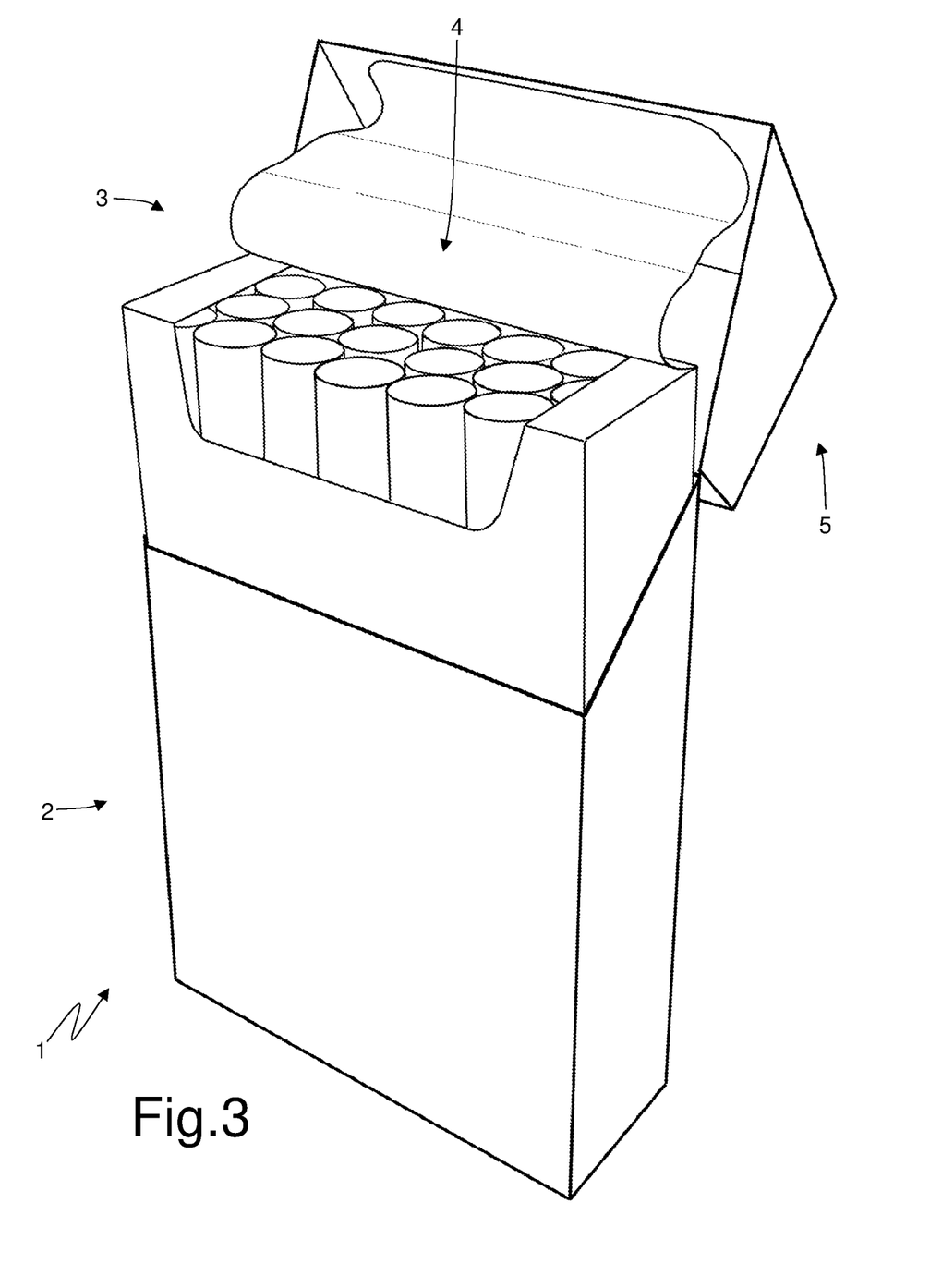
FIG. 3 is a front perspective view of the packet of cigarettes of FIG. 1 in an open configuration.

In FIGS. 1, 2 and 3, number 1 denotes as a whole a rigid packet of cigarettes. The packet 1 of cigarettes comprises an outer container 2 which is made of cardboard or rigid paperboard, is cup-shaped, houses an inner wrap 3 containing a group 4 of cigarettes, and is provided with a hinged lid 5.

Figure 4:
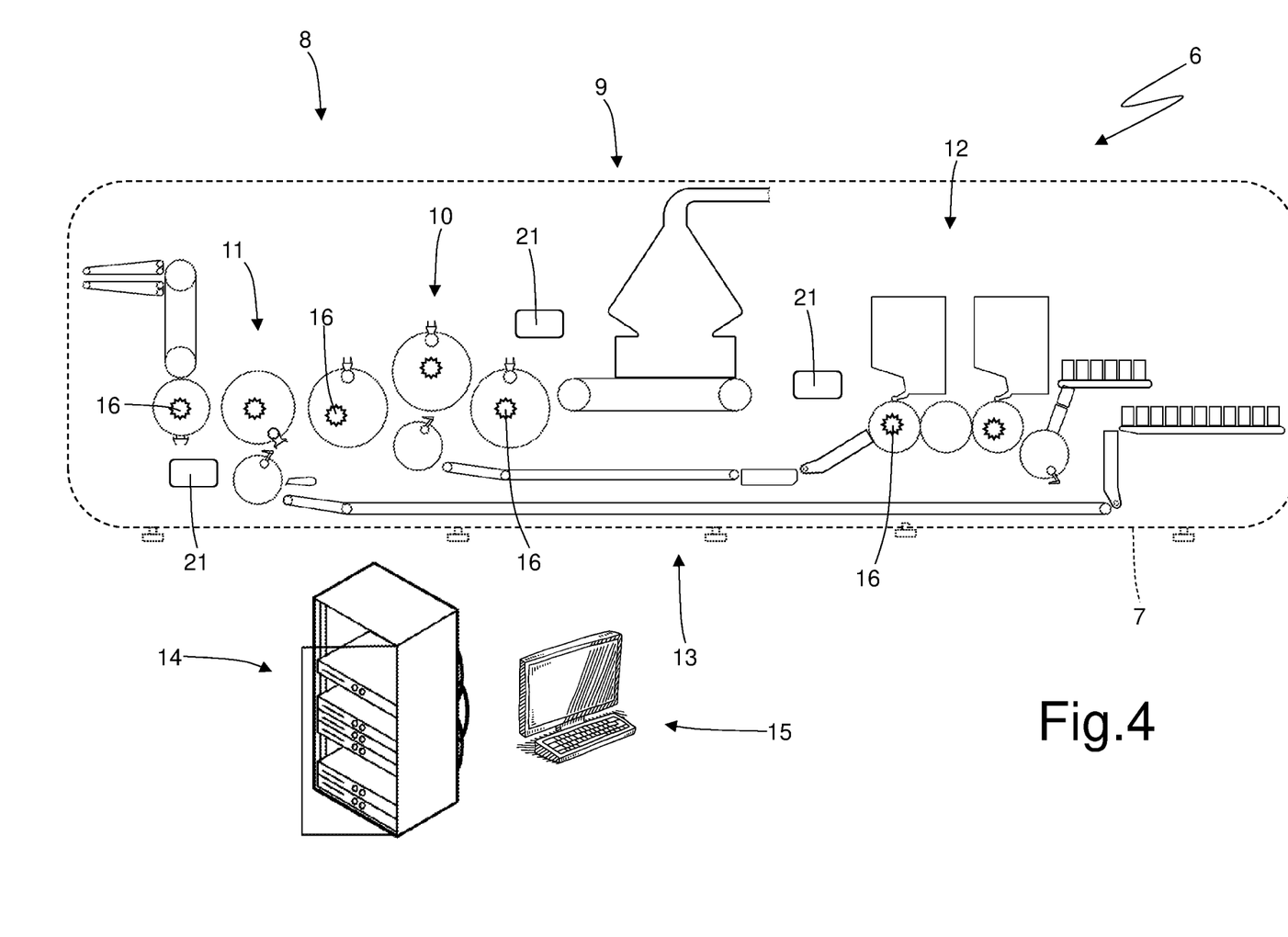
FIG. 4 is a schematic and front view of a packing machine which produces the packet of cigarettes of FIG. 1 and is made according to the present invention.
Figure 5:
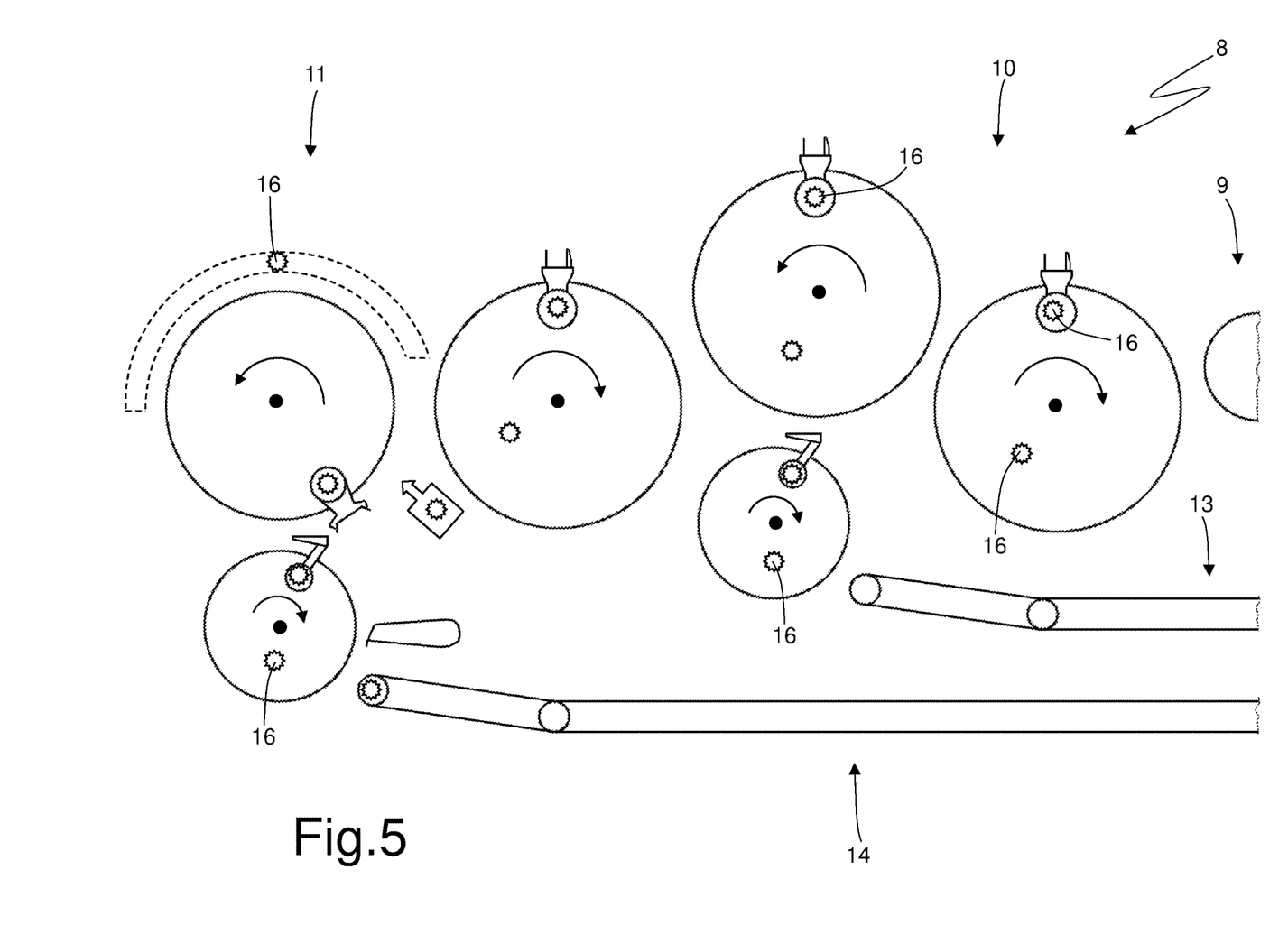
FIG. 5 is an enlarged scale view of a detail of FIG. 4.

In FIG. 4, the number 6 denotes as a whole a packing machine which is designed to manufacture the packet 1 of cigarettes.

The packing machine 6 comprises a frame 7 which rests on the floor and supports a processing line 8 along which the processing (i.e. packing) of the cigarettes (which form the product processed by the processing line 8) is carried out. The following are arranged along the processing line 8: a forming unit 9 in which the groups 4 of cigarettes are formed in succession, a wrapping unit 10 around which a wrapping sheet (typically made of metallized paper) is folded around each group 4 of cigarettes to form the corresponding inner wrap 3, and a wrapping unit 11 around which a blank (typically of cardboard and already provided with pre-weakened folding lines) is folded around each inner wrap 3 to form the corresponding outer container 2 provided with the hinged lid 5. A feed unit 12 is coupled to the wrapping unit 10, which feeds the wrapping sheets in succession to form the inner wraps 3, while a feed unit 13 is coupled to the wrapping unit 11, which feeds the blanks in succession to form the outer containers 2.

The packing machine 6 comprises a plurality of components (for example linear conveyors, rotating conveyors, gluing devices, fixed folders, mobile folders, control members, support heads, pulleys, belts, pushers, pockets for the groups 4 of cigarettes, electronic boards, electric motors, electric actuators, pneumatic valves . . . ), which are distributed along the processing line 8 to form the processing line 8 (i.e. to form the various units 9-13 of which the processing line 8 is composed).

Furthermore, the packing machine 6 comprises a control unit 14, which supervises the operation of the packing machine 6 and therefore the operation of the processing line 8. Normally, the control unit 14 is provided with (at least) one user interface device 15, which is provided with a screen and with an input member (keyboard, pointing system, touch screen); the user interface device 15 could also by formed by a tablet computer or a laptop that communicates wirelessly with the control unit 14.

The packing machine 6 is adaptable to produce different formats of packets 1 of cigarettes, namely packets 1 of larger cigarettes (for example containing groups 4 of cigarettes formed by twenty cigarettes), packets 1 of smaller cigarettes (for example containing groups 4 of cigarettes formed by ten cigarettes), packets 1 of longer/shorter cigarettes (because the single cigarettes are longer/shorter), packets 1 of wider/narrow cigarettes (because the single cigarettes are wider/narrower). To adapt the packing machine 6 to the production of a different format of the packets 1 of cigarettes it is necessary to change the format; that is, the format change involves adjusting the packing machine 6 from processing an old format of the packets 1 of cigarettes to processing a new format of the packets 1 of cigarettes different from the old format.

Preliminarily, all and only the components of the processing line 8 of the packing machine 6 that need to be replaced during a format change are identified; obviously a certain type of format change could involve only a part of the components that need to be replaced during a format change, while another type of format change could involve a different part of the components that need to be replaced during a format change. In other words, not all the components that potentially have to be replaced during a format change are actually all replaced at each format change.

Obviously, by "components" we mean complex and ad hoc built pieces that make up the processing line 8 of the packing machine 6 and not, for example, the small metal parts (nuts, washers, screws, bolts, pins . . . ) used to fix (install) the components.

Furthermore, preliminarily, a respective electronic identification device 16 is associated with each one of all and only the components that need to be replaced during the format change; i.e. an electronic identification device 16 is installed (fixed) on each one of all and only the components that need to be replaced during the format change; for example an electronic identification device 16 could be glued directly on the outer surface of a respective component by interposing a permanent glue which can be applied in a fluid form (more or less dense) or can be applied in the form of a double-sided adhesive tape. During this operation, possible small components that need to be replaced during the format change are identified (namely components that are too small to be coupled with a respective electronic identification device 16) and therefore possible small component that needs to be replaced during the format change is firmly (permanently) joined to at least another adjacent component to build one single indivisible component that needs to be replaced during the format change; in this case, to build one single indivisible component that needs to be replaced during the format change, a small component that needs to be replaced during the format change is joined to an adjacent component that must not be replaced during the format change (for the sole purpose of finally have a component that needs to be replaced during the format change sufficiently large to be coupled to a respective electronic identification device 16).

Generally (but not necessarily), each electronic identification device 16 is fixed in a non-separable manner (if not by destroying) to the corresponding component so that to remove the electronic identification device 16 from the component, it is necessary to destroy the electronic identification device 16; in other words, an electronic identification device 16 is never separated from the corresponding component except in the event of a malfunction of the electronic identification device 16 (in this case the old malfunctioning electronic identification device 16 is destructively "torn" from the component and replaced with a new electronic identification device 16 functioning correctly).

Figure 6:
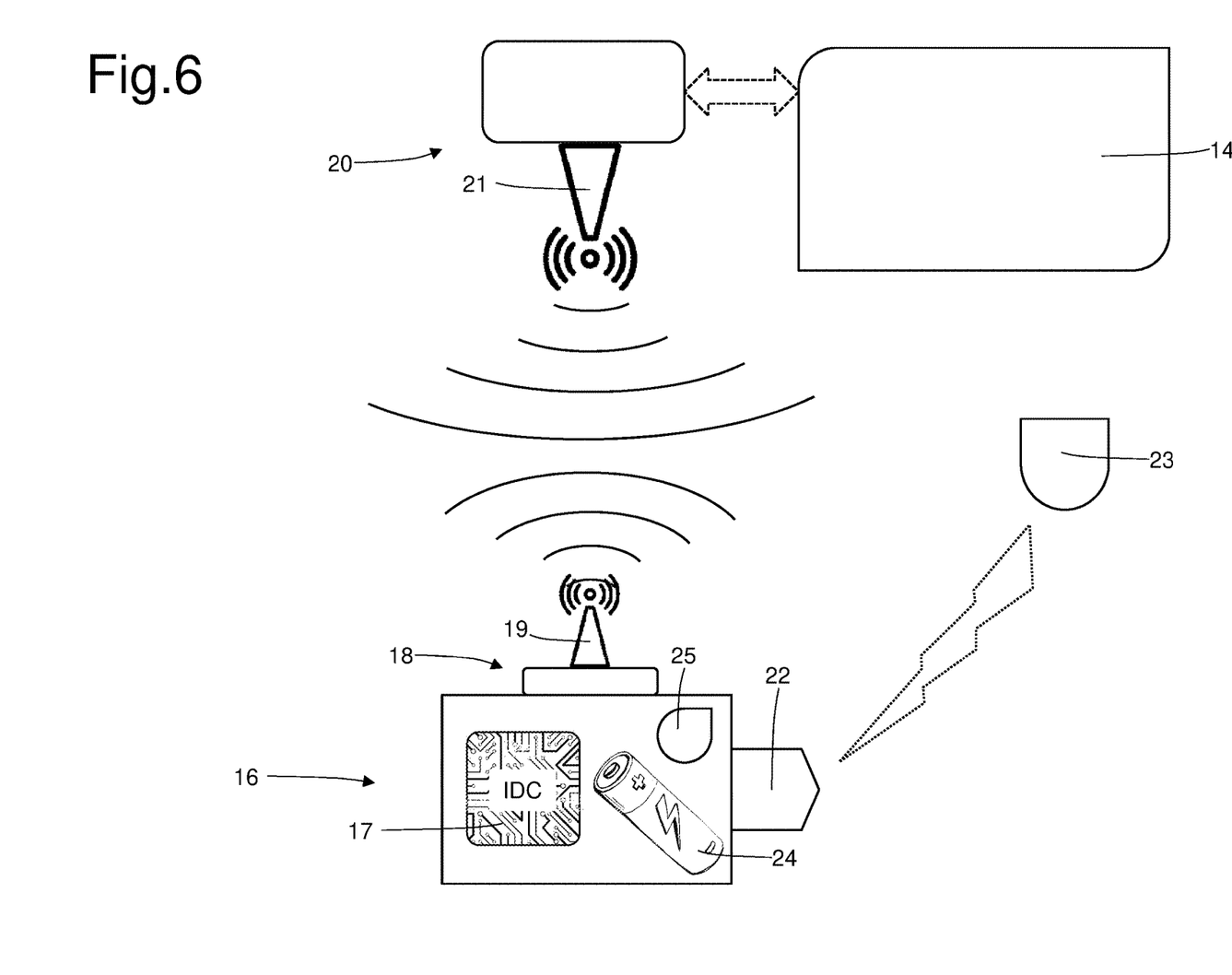
FIG. 6 is a schematic view of an electronic identification device associated with a component of the packing machine of FIG. 4 and of a communication member of a control unit of the packing machine of FIG. 4.

As illustrated in FIG. 6, each electronic identification device 16 comprises a programmable memory 17 designed to contain a series of data of the component; in particular, the memory 17 of each electronic identification device 16 contains at least one univocal identifying code IDC the respective component which serves to identify the component with certainty; obviously this data is attributed to the component at the time of its production and is never modified.

The programmable memory 17 of each electronic identification device 16 is designed to contain only and exclusively a series of data of the corresponding component and therefore is not designed to contain data of a manufacturing process or other data which are not data of the corresponding component.

As illustrated in FIG. 6, each electronic identification device 16 comprises a wireless communication member 18 (namely that uses electromagnetic waves), which is designed to send and receive the data contained in the programmable memory 17 and comprises, among other things, an antenna 19. According to what is illustrated in FIG. 6, the packing machine 6 comprises a wireless communication member 20 (namely that uses electromagnetic waves), which is connected to the control unit 14 and is designed to communicate with the communication member 18 of each electronic identification device 16 and is arranged in a fixed position (i.e. it is installed on the frame 7 of the packing machine 6). In particular, the wireless communication member 20 comprises at least one antenna 21 that emits and receives radio waves; according to the embodiment illustrated in FIG. 4, the wireless communication member 20 (schematically illustrated in FIG. 6) comprises a plurality (for example three) antennas 21, which are arranged in different positions of the frame 7 of the packing machine 6 to ensure adequate coverage for the entire packing machine 6. According to a preferred, but not limiting, embodiment, the wireless communication member 20 comprises a single common communication device which, in use, uses the various antennas 21 in sequence to communicate in sequence with the communication members 18 of all electronic identification devices 16; in other words, the common communication device is connected in sequence with one antenna 21 at a time to interrogate the communication members 18 of the electronic identification devices 16 of the components arranged in the working area of said antenna 21.

According to a possible embodiment, each wireless communication member 18 is able to communicate both with the wireless communication member 20 of the control unit 14 and with the other wireless communication members 18 (without passing through the wireless communication member 20); in other words, each wireless communication member 18 can interrogate another wireless communication member 18 or can respond to another wireless communication member 18 independently of the wireless communication member 20 of the control unit 14. For example, in some situations the wireless communication member 20 of the control unit 14 could ask a wireless communication member 18 to interrogate another wireless communication member 18 (somehow shielded, namely invisible, to the wireless communication member 20) acting as a "radio link".

According to what is illustrated in FIG. 6, each electronic identification device 16 comprises a wireless energy receiving member 22 (namely which uses electromagnetic waves) which is designed to receive energy from the outside in order to convert the energy received from the outside into electric energy which is supplied to the electronic identification device 16 for its operation. In other words, each wireless energy receiving member 22 generates the electric energy necessary for the operation of the electronic identification device 16 by converting at least part of the energy received from the outside into electric energy. According to a preferred embodiment illustrated in FIG. 6, the packing machine 6 comprises (at least) one wireless energy transmitting member 23 designed to transfer energy to the wireless energy receiving members 22.

According to a possible embodiment, each wireless energy receiving member 22 comprises (at least) one photovoltaic cell and the energy transmitting member 23 comprises at least one light emitter that emits light capable of being absorbed by the photovoltaic cell. According to an alternative embodiment, each wireless energy receiving member 22 comprises an antenna designed to capture electromagnetic radiations and the wireless energy transmitting member 23 is designed to emit high energy electromagnetic radiations which is captured by the antennas of the wireless energy receiving members 22.

Preferably, each electronic identification device 16 comprises an electric energy storage member 24 which receives electric energy from the wireless energy receiving member 22; in this way, the wireless energy receiving member 22 can continuously generate a modest electric power to keep the electric energy storage member 24 charged and the electric energy storage member 24 provides relatively high electric power when the wireless communication member 18 is activated. Preferably, the electric energy storage member 24 comprises a chemical battery and/or a capacitor.

From what has been described above, it is evident that each electronic identification device 16 is not wired, that is, it is not connected with any physical cable, since communications and energy reception take place only and exclusively in wireless mode.

By way of example, each electronic identification device 16 has an area of about 1 $cm^2$ and a thickness of about 4-7 mm.

Each format change operation is divided into an orderly succession of operations for the removal of components designed for the old format and installation of components designed for the new format; normally a component designed for the old format is replaced with a component designed for the new format but it may also occur that a component designed for the old format is removed without being replaced or that a component designed for the new format is installed without replacing a component designed for the old format. The orderly succession of removal and/or installation operations is, for example, stored in the control unit 14.

During the execution of the format change, the control unit 14, by means of the user interface device 15, dialogues in an interactive manner with the operator who has to carry out the format change operations (namely with the format change operator) to communicate to the operator the orderly succession of removal and installation operations. Obviously, the orderly succession of removal and installation operations could be interspersed with other operations that do not involve removal or installation of components but provide for example the cleaning or adjustment of existing components.

During the execution of the format change, the control unit 14 electronically and automatically detects the actual presence or absence, in the packing machine 6, of a component designed for the old or new format before communicating the removal or installation operation of the component to the operator and, subsequently, electronically and automatically detects the actual absence or presence, in the packing machine 6, of a component designed for the old or new format after having communicated the operation for the removal or installation of the component to the operator; therefore, the control unit 14 communicates to the operator the operation following a removal or installation of a component only after having electronically and automatically checked for the actual absence or presence of the component in the packing machine 6.

In particular, during the execution of the format change, the control unit 14 electronically and automatically detects the actual absence or presence of a component in the packing machine 6 by electronically and automatically detecting the actual absence or presence, in the packing machine 6, of the electronic identification device 16 associated with the component.

In other words, the control unit 14 electronically and automatically detects the actual presence, in the packing machine 6, of a component designed for the old format before communicating the operation for the removal of the component to the operator, electronically and automatically detects the actual absence, in the packing machine 6, of a component designed for the old format after having communicated the operation for the removal of the component to the operator, and communicates to the operator the operation following an operation for the removal of a component only after having electronically and automatically checked for the actual absence of the component in the packing machine 6. Furthermore, the control unit 14 electronically and automatically detects the actual absence, in the packing machine 6, of a component designed for the new format before communicating the operation for the installation of the component to the operator, electronically and automatically detects the actual presence, in the packing machine 6, of a component designed for the new format after having communicated the operation for the installation of the component to the operator and communicates to the operator the operation following an operation for the installation of a component only after having electronically and automatically checked for the actual presence of the component in the packing machine 6.

According to a preferred, but not binding, embodiment, the control unit 14 requests from the operator a confirmation of completion of a component removal or installation operation before electronically and automatically detecting the actual absence or presence of the component in the packing machine 6; in this way, the control unit 14, during communication of the orderly succession of removal and/or installation operations to the operator, the operator's own execution schedule follows without imposing a predefined schedule to the same.

To give a practical example, the control unit 14 electronically and automatically detects the actual presence of a component A designed for the old format and then communicates to the operator to perform the removal operation of component A (by verifying that component A is still present, the control unit 14 avoids requiring the removal of component A if the latter has already been removed); at this point, the control unit 14 waits for the operator to perform the removal operation of component A (then waits for the operator to confirm completion of the removal operation of component A) and checks the completion of the removal operation of component A, thus checking the actual absence of component A. Only after the control unit 14 has checked for the actual absence of component A, namely has checked for the completion of the removal operation of component A, the control unit 14 electronically and automatically detects the actual absence of a component B designed for the new format (which must take the place of component A) and then communicates to the operator to perform the installation operation of component B (verifying that the component B is still absent, the control unit 14 avoids requiring the installation of component B if this has already been installed); at this point, the control unit 14 waits for the operator to carry out the installation operation of component B (then waits for the operator to confirm the completion of the installation operation of component B) and checks the completion of the installation operation of component B by checking the actual presence of component B. Only after the control unit 14 has checked for the actual presence of component B, namely has checked for the completion of the installation operation of component B, the control unit 14 proceeds to signal to the operator the subsequent removal or installation of components and so on until the format change is complete.

As mentioned above, the various operations of removal or installation of components may be interspersed with other operations other than removal or installation of components which are signalled to the operator by the control unit 14 when necessary.

It is clear that when a component is installed on the packing machine 6, the control unit 14 can detect the presence of the corresponding electronic identification device 16 as it is able to communicate with the electronic identification device 16; to prevent the control unit 14 from being deceived by a component that is not installed on the packing machine 6 but is located near the packing machine 6, a storage area is normally provided, which is designed to accommodate all the components designed for the old format removed from the packing machine 6 and all the components designed for the new format to be installed on the packing machine 6 and is configured so that the electronic identification device 16 of each component in the storage area cannot be detected by the control unit 14 (namely is unable to communicate with control unit 14). In particular, the storage area is at a given distance and sufficiently far away from the control unit 14 and/or is provided with a metal shield which stops electromagnetic waves; obviously, the communication power of the wireless communication members 18 and 20 is sized so that the wireless communication member 20 can reach (communicate with) the wireless communication members 18 of the electronic identification devices 16 only within a relatively modest distance (a few meters, in particular from 1 to 3 meters) i.e. only in close proximity to the packing machine 6.

The format change could be performed by several operators at the same time; in this case, several orderly successions of operations for the removal of components designed for the old format and for the installation of components designed for the new format can be provided, each of which is communicated step by step to a relative operator; obviously, the different orderly successions of operations are studied to avoid interference between the various operators (i.e. to prevent the various operators from interfering with each other, thus hindering each other).

According to a possible embodiment illustrated in FIG. 6, each electronic identification device 16 (or only a part of the electronic identification devices 16) comprises a sensor 25 which is designed to measure the value of a physical quantity (temperature, acceleration, pressure, humidity . . . ) correlated with the stress factors (thermal, mechanical, environmental . . . ) to which the components of the processing line 8 are subjected. That is, each electronic identification device 16 (or only a part of the electronic identification devices 16) comprises a sensor 25 which is designed to measure the value of a physical quantity to which the electronic identification device 16 is subjected (and therefore the component coupled to the electronic identification device 16). By way of example, each sensor 25 could comprise a triaxial accelerometer for measuring the accelerations along three mutually perpendicular axes, it could comprise a position detector, and/or it could comprise a temperature, pressure or humidity detector; for example, for a dynamic component that moves cyclically (such as the support head of a wrapping wheel) it is more useful to check the accelerations, whereas for a static component that remains stationary and is heated (such as a gluing device) it is more useful to check the temperature, pressure or humidity.

In each electronic identification device 16, the signals measured by the sensor 25 can be cyclically stored in the memory 17 (for example by keeping track of the minimum value, the maximum value and the average value).

Each electronic identification device 16 is combined with a respective component of the processing line 8 and the memory 17 of each electronic identification device 16 can contain a series of data relating to the component: some of these data relate to the conformation of the component and therefore they are never modified or are modified very rarely (for example during overhaul or update interventions) while other data relate to the operational life of the component (namely containing a record of events of the operational life of the component) and are therefore cyclically updated (for example every minute) during the operation of the packing machine 6. In other words, during the operation of the packing machine 6, each electronic identification device 16 modifies the content of its own memory 17 to update the events of the operational life of the respective component.

Figure 7:
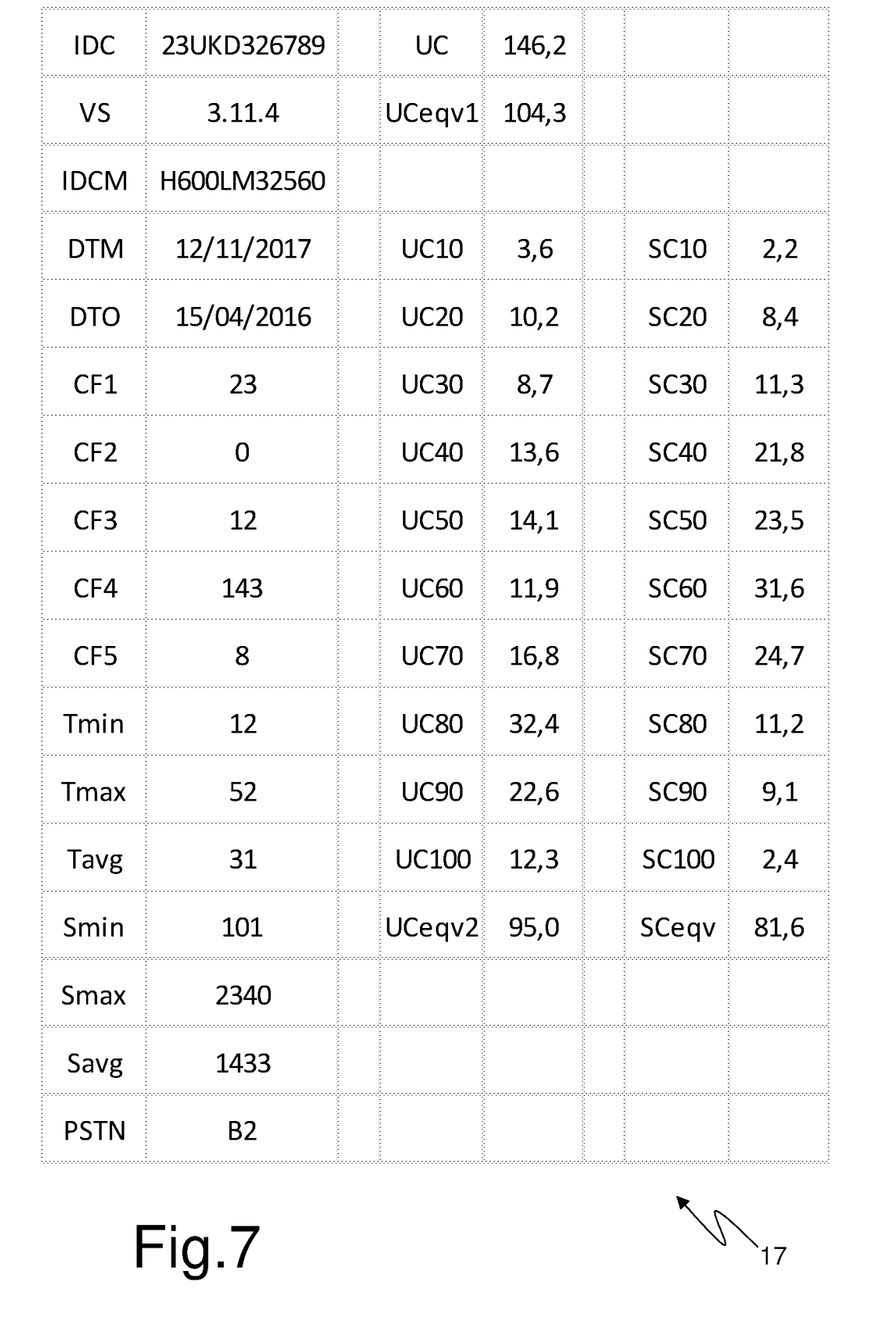
FIG. 7 is a schematic view of part of the contents of a programmable memory of the electronic identification device of FIG. 6.

As illustrated in FIG. 7, the memory 17 of each electronic identification device 16 contains a code VS, which indicates the version of the corresponding component, i.e. indicates the updating degree of the component; this data is modified following a component update intervention.

According to what is illustrated in FIG. 7, the memory 17 of each electronic identification device 16 contains a univocal identifying code IDCM of the packing machine 6 (which serves to univocally identify the packing machine 6) in which the respective component is installed; this data is changed each time the component is installed on a new packing machine 6 and indicates the last packing machine 6 in which the component was used. In other words, the control unit 14 writes the univocal identifying code IDCM of the packing machine 6 in the memory 17 of an electronic identification device 16 when the corresponding component is installed for the first time in the packing machine 6. According to a different and perfectly equivalent embodiment, several identifying codes IDCM could be provided to memorize not only the last packing machine 6 in which the component was used, but the last five (ten, fifteen, twenty . . . ) automatic machines 6 in which the component was used; an hour-counter could also be associated with each identifying code IDCM to indicate the total number of hours of use of the component in the corresponding packing machine 6.

As illustrated in FIG. 7, the memory 17 of each electronic identification device 16 contains a given date DTM of the first installation of the corresponding component in the packing machine 6; this data is modified each time the component is installed in a new packing machine 6 and indicates the date in which the component was first installed in the last packing machine 6 in which the component was used. In other words, the control unit 14 writes the date DTM of the first installation in the memory 17 of an electronic identification device 16 when the corresponding component is installed for the first time in the packing machine 6. According to a different and perfectly equivalent embodiment, several dates DTM of the first installation could be provided to memorize not only the last packing machine 6 in which the component was used, but the last five (ten, fifteen, twenty . . . ) packing machines 6 in which the component was used.

According to what is illustrated in FIG. 7, the memory 17 of each electronic identification device 16 contains a last revision date DTO which indicates the last time that the corresponding component was revised; this data is modified following a component revision.

According to a possible, but not limiting, embodiment illustrated in FIG. 7, the memory 17 of some electronic identification devices 16 contains stress data Tmin, Tmax, Tavg, Smin, Smax, Savg correlated with the physical quantities (in the embodiment illustrated temperature and accelerations) measured by the sensor 25. In the non-limiting embodiment illustrated in FIG. 7, the memory 17 of some electronic identification devices 16 contains the minimum temperature Tmin, the maximum temperature Tmax and the average temperature Tavg at which the corresponding component has operated and also contains the minimum level Smin of accelerations (vibrations), the maximum level Smax of accelerations (vibrations), and the average level Savg of accelerations (vibrations) at which the corresponding component has operated. In use, the sensor 25 is read cyclically and, if necessary, the stress data Tmin, Tmax, Tavg, Smin, Smax, Savg of the memory 17 of each electronic identification device 16 are updated.

According to a possible, but not limiting, embodiment illustrated in FIG. 7, the memory 17 of some electronic identification devices 16 contains a plurality of stress counters SC10-SC100 indicating the actual work time of the corresponding component at different values assumed by the physical quantity measured by the sensor 25; in the example illustrated in FIG. 7, ten stress counters SC10-SC100 are provided indicating the actual work time (normally measured in hours) of the respective component at 10%, 20%, 30% . . . 90%, 100% of the maximum stress. According to a possible embodiment illustrated in FIG. 7, an equivalent stress counter SCeqv is also provided which contains a value calculated, for example, by linear combination (with obviously different weights) of the ten stress counters SC10-SC100 and establishes an equivalent work time (normally measured in hours) of the component that takes into account the actual stresses to which the component was subjected during its use; obviously in the calculation of the equivalent stress-counter SCeqv, the actual work time at modest stresses (namely the stress counters SC10-S30) counts less than actual work time at high stress (namely the stress counters SC70-SC100) and the weights with which the ten stress-counters SC10-SC100 are combined are generally determined with theoretical calculations and possibly refined experimentally (i.e. by means of experimental checks).

It is evident that stress counters SC10-SC100 can be useful for some more complex components (therefore of higher cost) and more sensitive to stresses while they are not useful for other simpler components (therefore of low cost) and less sensitive to stresses; furthermore, some components may be more sensitive to mechanical stresses (therefore it makes sense to keep track of the accelerations measured by the sensor 25) while other components may be more sensitive to thermal stresses (therefore it makes sense to keep track of the temperatures measured by the sensor 25).

According to the embodiment illustrated in FIG. 7, the memory 17 of each electronic identification device 16 contains a usage counter UC indicating the actual work time (normally measured in hours) of the corresponding component; in use, when the processing line 8 is in operation to process the products (namely the groups 4 of cigarettes), the content of the memory 17 of each electronic identification device 16 is updated cyclically to increase the usage counter UC of the corresponding component.

According to a possible, but not limiting, embodiment illustrated in FIG. 7, the memory 17 of each electronic identification device 16 contains an equivalent usage counter UCeqv1, which indicates the equivalent work time (normally measured in hours) of the respective component and it is increased not with the actual operating time (unlike the usage counter UC), but with an equivalent operating time which is established as a function of the actual operating speed of the packing machine 6. In other words, a nominal operating speed is provided which represents the maximum operating speed that can be reached by the processing line 8 (namely by the packing machine 6) and the control unit 14 is designed to determine an actual operating speed at which the processing line 8 (namely the packing machine 6) is operating; the equivalent usage counter UCeqv1 of the corresponding component is increased by a quantity that is a function of the elapsed time interval and the ratio between the actual operating speed and the nominal operating speed.

According to a possible, but not limiting, embodiment illustrated in FIG. 7, alternatively or in combination with the equivalent usage counter UCeqv1, the memory 17 of some electronic identification devices 16 contains a plurality of usage counters UC10-UC100 indicating the actual work time (usually measured in hours) of the corresponding component at different operating speeds; in the example of FIG. 12, ten stress counters UC10-UC100 are provided indicating the actual work time (normally measured in hours) of the corresponding component at 10%, 20%, 30% . . . 90%, 100% of the nominal operating speed. According to a possible embodiment illustrated in FIG. 7, an equivalent usage counter UCeqv2 is also provided, which contains a value calculated, for example, by linear combination (obviously with different weights) of the ten usage counters UC10-UC100 and represent an equivalent work time (normally measured in hours) of the component which takes into account the actual operating speeds maintained by the component during its use; obviously in the calculation of the equivalent usage counter UCeqv2, the actual work time at modest operating speeds (namely the usage counters UC10-S30) counts less than the actual work time at high operating speeds (namely the usage counters UC70-UC100) and the weights with which the ten usage counters UC10-UC100 are combined are generally given with theoretical and possibly experimentally refined calculations (or by experimental checks).

According to a possible, but not limiting, embodiment illustrated in FIG. 7, the memory 17 of each electronic identification device 16 contains a position code PSTN which indicates the actual position of the corresponding component inside the packing machine 6, i.e. indicates where the respective component is located inside the packing machine 6.

The position code PSTN is generally used for all components that can be installed on the packing machine 6 in different positions. For example, the packing machine 6 could use three identical gluing devices which are installed on three different positions and it is evident that each gluing device can be indifferently installed on each of the three different positions; in this case, the position code PSTN indicates in which position of the three different positions a given gluing device was actually installed. For example, each wrapping wheel of the packing machine 6 comprises a plurality of twin heads (for example from six to twelve heads for each wrapping wheel) and in a wrapping wheel a head can be installed on a series of different positions; in this case, the position code PSTN indicates in which position (e.g. position 1, 2, 3 . . . 11, 12) a given head has actually been installed on the respective wrapping wheel. For example, the packing machine 6 could use a series of identical electric motors which are installed on different positions and it is evident that each electric motor can be indifferently installed on each of the possible different positions; in this case, the position code PSTN indicates in which position of the possible different positions a given electric motor has actually been installed. Knowing the exact position of a given component in the packing machine 6 (obviously when the component can be installed on at least two different positions) allows to check whether the same component is subject to the same type of wear or to different wear when it is installed in different positions.

The position code PSTN is also generally used for all components that can be installed on the packing machine 6 in incorrect positions, for example by (erroneously) exchanging the position of two components. For example, a sideboard designed to stay on the left of a path could be (mistakenly) installed on the right and vice versa.

The position code PSTN is not generally used (namely it is ignored) for all components that can be installed on the packing machine 6 in a single position and cannot (due to their size and/or conformation) be (erroneously) installed in incorrect positions. For example, each wrapping wheel of the packing machine 6 can normally be installed in a single position and therefore there is no possibility that a wrapping wheel of the packing machine 6 is installed in a position other than the one provided; it is also not possible for a wrapping wheel to be installed in the wrong position as it is generally physically impossible to install a wrapping wheel in a position other than the one provided.

According to a possible embodiment, the position of a given component is entered "manually" by an operator (normally the operator who installed the component in the packing machine 6); in other words, the operator, at the end of the installation of the component in the packing machine 6, communicates to the control unit 14 (generally by means of the user interface device 15) the actual position of the component and the control unit 14 writes this position in the memory 17 of the respective electronic identification device 16 (in particular in the position code PSTN contained in the memory 17). Obviously, this operation is performed only for the components which can be installed on the packing machine 6 in different or incorrect positions. In this case, the control unit 14 at the end of the intervention of an operator could automatically determine the presence of a new component by means of the respective electronic identification device 16 and, if the data is considered useful, it could request the operator to insert the actual position of the component in the packing machine 6 before giving consent to the starting of the packing machine 6.

According to a different embodiment, the position of some components in the packing machine 6 is not entered "manually" by an operator but is automatically determined by an electronic localization system connected to the control unit 14.

According to a preferred embodiment, the control unit 14 signals the need for cleaning/maintenance/overhaul/replacement on a component of the processing line 8 as a function of the data stored in the memory 17 of the corresponding electronic identification device 16. To determine the need for cleaning/maintenance/overhaul/replacement of a component, the control unit 14 takes into account all the data contained in the memory 17 of the corresponding electronic identification device 16 and relating to the events of the operational life of the corresponding component; obviously greater importance is given to the usage counter UC indicating the actual work time (normally measured in hours) of the corresponding component but all the other data is also taken into account to anticipate or delay the cleaning/maintenance/overhaul intervention/replacement in the case where the component has been less stressed or more stressed than average.

According to a possible embodiment, the control unit 14 cyclically reads some or all of the data contained in the memories 17 of all the electronic identification devices 16, stores said data in its own local mass storage device (typically a hard disk or a solid state memory), and also transmits said data to a remote server of the manufacturer of the packing machine 6; that is, from a remote server it is possible to interrogate, by means of the control unit 14, all of the electronic identification devices 16 present in the packing machine 6. In this way, the manufacturer of the packing machine 6, by collecting the data coming from all the packing machines 6 installed in the world, can carry out large-scale statistical processing operations that allow to optimize the predictive maintenance of the automatic machines 6 (predictive maintenance is a type of preventive maintenance that is carried out following the identification of one or more parameters that are measured and extrapolated using appropriate mathematical models in order to identify the residual time before failure). Furthermore, in this way the manufacturer of the packing machine 6 can know in real time the actual composition of each packing machine 6 installed in the world, that is, can know exactly all the components that are currently installed (and therefore operating) on each packing machine 6 installed in the world, thus being able to program the production of spare parts with greater certainty and therefore also being able to check that all the components that are currently installed (and therefore operating) in each packing machine 6 installed in the world are original and are completely compatible (not only as components as such, but rather as component versions, namely, for example, version X of one component may not be fully compatible with version Y of another component).

In the exemplary embodiment illustrated in the attached figures, the automatic machine 6 is a packing machine which produces packets 1 of cigarettes; according to other perfectly equivalent and not illustrated embodiments, the automatic machine 6 could be a cigarette packing machine, a cigarette filter packing machine, a packing machine that applies a transparent overwrap to packets of cigarettes, a packing machine that makes cartons of packets of cigarettes, a cartoning machine, a packing machine that produces food product packages, a packing machine that produces medicines, a packing machine that produces medicine packages, a packing machine that produces packages of absorbent hygiene articles, a packing machine of absorbent hygiene articles, etc. . . . In other words, the products processed by the packing machine consist of smoking articles, hygiene articles, food articles, or pharmaceutical articles.

The embodiments described here can be combined with each other without departing from the scope of protection of the present invention.

The assistance method described above has several advantages.

In the first place, the assistance method described above allows all the format change operations to be guided in an effective and efficient manner, step by step, so that all the format change operations can be carried out safely even by a not particularly expert operator. This result is also achieved thanks to the fact that the control unit 14 can check the actual absence or presence of a component designed for the old or new format after communicating the removal or installation operation of the component to the operator; in this way the operator is never asked to perform a subsequent operation if the previous operation has not actually been completed.

Furthermore, the assistance method described above is relatively simple and inexpensive to implement, since it uses commercial components (electronic identification devices 16) which are low cost and easily available on the market.

Finally, the automatic machine 6 described above allows to program in an extremely precise and reliable way the maintenance of the components that are installed and/or removed from the automatic machine 6 at each format change.

The invention claimed is:

1. An assistance method for the execution of a format change in an automatic machine (6) for manufacturing or packing of smoking, hygiene, food, or pharmaceutical products; the format change involves adjusting the automatic machine (6) from the processing of an old product format to the processing of a new product format, which is different from the old format; the automatic machine (6) comprises at least one processing line (8), along which the processing of the products is carried out and a plurality of components, which are distributed along the processing line (8) so as to form the processing line (8);

the assistance method comprises the steps of:
identifying all and only the components that need to be replaced during the format change;
dividing the format change into an orderly succession of operations for the removal of components designed for the old format and/or for the installation of components designed for the new format; and
communicating the orderly succession of removal and/or installation operations to an operator taking care of the format change;
associating a corresponding electronic identification device (16) with each one of all and only the components that need to be replaced during the format change, i.e. an electronic identification device (16) is installed, that is fixed, on each one of all and only the components that need to be replaced during the format change;
electronically and automatically detecting, by means of a control unit (14), the actual absence/presence of a component by electronically and automatically detecting the actual absence/presence of the electronic identification device (16) associated with the component;
electronically and automatically detecting the actual absence, in the automatic machine (6), of a component designed for the old format after having communicated the operation for the removal of the component to the operator;
communicating to the operator the operation following an operation for the removal of a component only after having electronically and automatically checked for the actual absence, in the automatic machine (6), of the component;
electronically and automatically detecting the actual presence, in the automatic machine (6), of a component designed for the new format after having communicated to the operator the operation for the installation of the component;

communicating to the operator the operation following an operation for the installation of a component only after having electronically and automatically checked for the actual presence, in the automatic machine (6), of the component;

electronically and automatically detecting the actual presence, in the automatic machine (6), of a component designed for the old format before communicating to the operator the operation for the removal of the component; and electronically and automatically detecting the actual absence, in the automatic machine (6), of a component designed for the new format before communicating to the operator the operation for the installation of the component.

2. The assistance method according to claim 1 and comprising the further steps of:

identifying possible small components that need to be replaced during the format change, wherein the small components that are too small to be coupled with a corresponding electronic identification device (16); and firmly joining a small component that needs to be replaced during the format change with at least another adjacent component so as to form a single indivisible component that needs to be replaced during the format change.

3. The assistance method according to claim 2, wherein, in order to form one single indivisible component that needs to be replaced during the format change, a small component that needs to be replaced during the format change is joined to an adjacent component that would not have had to be replaced during the format change.

4. The assistance method according to claim 1, wherein:

each electronic identification device (16) comprises a first wireless communication member (18); and the control unit (14) is provided with a second wireless communication member (20) designed to communicate with the first wireless communication members (18).

5. The assistance method according to claim 4, wherein each first wireless communication member (18) is designed to also communicate with the other first wireless communication members (18).

6. The assistance method according to claim 1, wherein each electronic identification device (16) comprises a wireless energy receiving member (22) which is designed to receive energy from the outside in order to turn the energy received from the outside into electric energy needed for the operation of the electronic identification device (16).

7. The assistance method according to claim 6, wherein each electronic identification device (16) comprises an electric energy storage member (24), which receives electric energy from the wireless energy receiving member (22).

8. The assistance method according to claim 6, wherein the automatic machine (6) comprises a wireless energy transmitting member (23), which is designed to transfer energy to the wireless energy receiving members (22).

9. The assistance method according to claim 6, wherein each wireless energy receiving member (22) comprises a photovoltaic cell.

10. The assistance method according to claim 9, wherein the automatic machine (6) comprises at least one light emitter, which emits light suited to be absorbed by the photovoltaic cell.

11. The assistance method according to claim 6, wherein:

each wireless energy receiving member (22) comprises an antenna designed to pick up electromagnetic radiation; and the automatic machine (6) comprises wireless energy transmitting member (23), which is designed to transfer energy to the wireless energy receiving members (22).

12. The assistance method according to claim 1 and comprising the further step of providing a storage area, which is designed to accommodate all the components designed for the old format and removed from the automatic machine (6) and all the components designed for new format to be installed in the automatic machine (6) and is configured so that the electronic identification device (16) of each component standing in the storage area cannot be detected by the control unit (14).

13. The assistance method according to claim 12, wherein the storage area is at a given and sufficiently far distance from the control unit (14) and/or is provided with a metal shield which stops electromagnetic waves.

14. The assistance method according to claim 1, wherein each electronic identification device (16) comprises a programmable memory (17) designed to contain a series of data of the component, among which there is a univocal identifying code (IDC) of the component.

15. The assistance method according to claim 1 and comprising the further step of having the operator ask for a confirmation of completion of a component removal or installation operation before electronically and automatically detecting the actual absence or presence of the component in the automatic machine (6).

16. An automatic machine (6) for manufacturing or packing smoking, hygiene, food, or pharmaceutical products and implementing the assistance method according to claim 1.

* * * * *